May 16, 1933.                G. M. EATON                1,909,489
HYPERBOLIC THREAD
Filed Jan. 19, 1928
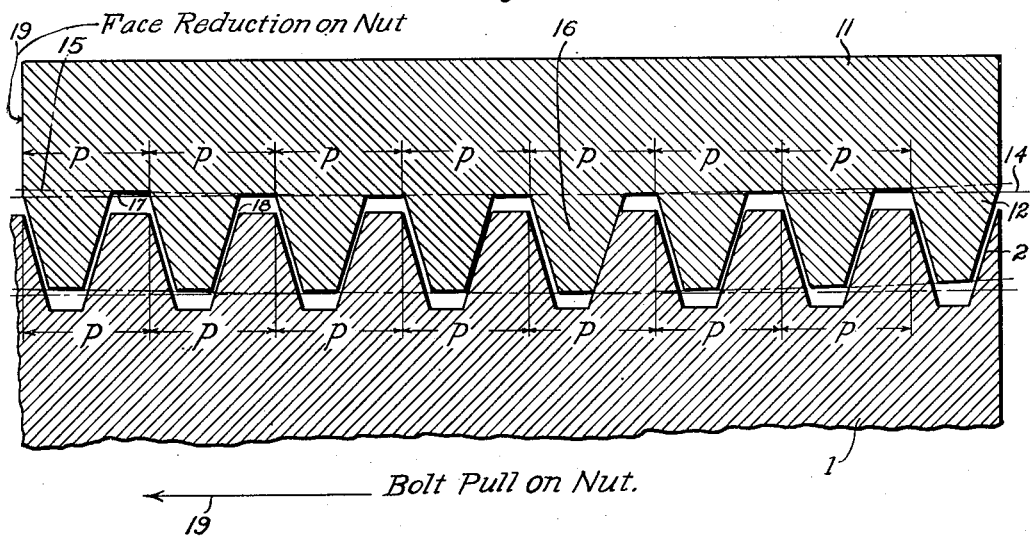
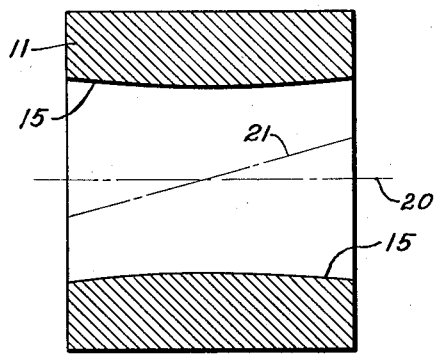
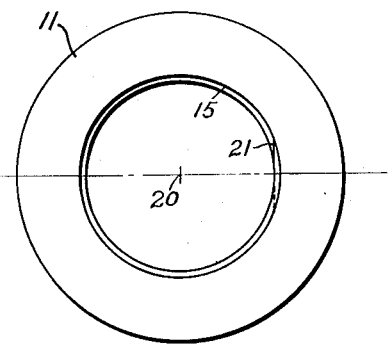
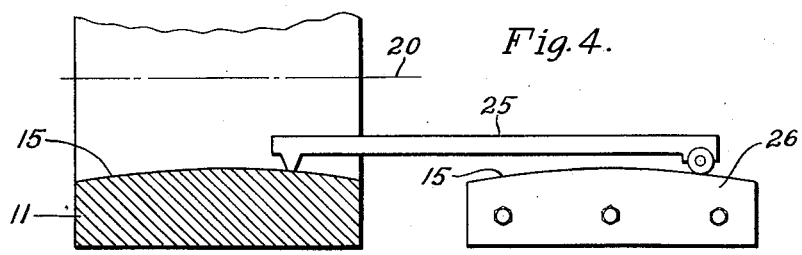
INVENTOR
George M. Eaton.
BY
ATTORNEY Patented May 16, 1933

1,909,489

UNITED STATES PATENT OFFICE

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA

HYPERBOLIC THREAD

Application filed January 19, 1928. Serial No. 247,888.

My invention relates to screw threads and in particular to screw threads which, when in engagement and loaded, distribute the load throughout their lengths.

In the devices of the prior art, it is common practice to provide nuts and bolts having threads of complementary shape and of substantially equal pitch and diameter. This combination of threads has been found to be satisfactory in small sizes and in applications where the force exerted upon the threads is relatively small in proportion to the elastic limit of the material utilized.

However, it has been found, that, when the standard type of screw thread is utilized in a bolt-and-nut structure of relatively large dimensions in which it is desirable to employ stresses in the material that approach the elastic limit, this construction is limited because of the non-uniform distribution of load resulting from the elastic deformation of the bolt or nut when stressed. In the well known bolt and nut, having uniform threads, wherein the bolt is loaded in tension and the nut in compression, the bolt deflects by elongating and the nut by contracting in such manner that the threads at the end of the nut to which the load is applied are required to support a large percentage of the total load. It has been found by suitable tests that practically the entire load imposed upon a nut and bolt of standard characteristics is carried by a portion of the nut having a length substantially equal to one-half of the diameter of the bolt. Therefore, it is impossible to strengthen a combination of uniform threads by increasing the length of the nut for the reason that the thread adjacent to the bearing surface of the nut will be subjected to substantially the same stress for any length of the nut greater than one-half the diameter of the bolt. In case the nut should be made exceptionally long, and an excessive load placed upon it, the first thread will be stressed beyond its ultimate strength and will fail, thereby imposing the load upon the second thread which will, in turn, fail and so on throughout the length of the nut.

It has been shown mathematically that, if the pitch of the thread in the nut is made slightly longer than the pitch of the thread in the bolt, the conditions of stress will be greatly improved, inasmuch as the unequal clearances between the threads will be compensated for by the elastic deformation of the bolt and nut at some predetermined load.

However, it has been found that, when an attempt is made to cut screw threads in which the pitch of the nut is different from the pitch of the bolt by an amount that is suitable for neutralizing the effect of elastic deformation therein, the degree of precision required is so great and the errors ordinarily encountered in cutting screw threads are of such magnitude, in proportion, that no beneficial results can be obtained in practice. At best, it is only possible to obtain two points of stress concentration instead of one, whereby the load is more or less divided between two portions of the nut.

It is an object of my invention to provide a bolt-and-nut structure in which the cooperating threads are so proportioned that substantially uniform stress distribution is obtained throughout the length of the engaging threads when a predetermined load is impressed upon the bolt.

It is another object of my invention to provide a threaded bolt-and-nut structure in which a predetermined variation in the longitudinal clearances between the threads of the nut and bolt is obtained by varying the diameter of the thread in the nut.

A further object of my invention is to provide a method of cutting the threads in a nut in such manner that substantially uniform stress distribution may be obtained throughout the length of the nut when it is subjected to a predetermined load.

In the accompanying drawing:

Figure 1 is a sectional view, of a portion of a nut and bolt showing a thread cut in accordance with my invention;

Fig. 2 is a longitudinal sectional view, of a nut blank, showing a line drawn to illustrate a path along which a tool may be moved to generate a screw thread in accordance with the invention;

Fig. 3 is a view, in end elevation, of the nut blank shown in Fig. 2, and

Fig. 4 is a longitudinal sectional view of a portion of a nut blank and a view in side elevation to illustrate diagrammatically another method that may be utilized for cutting a thread of the type to be disclosed in the description.

Referring to Fig. 1, of the drawing, the bolt-and-nut mechanism therein illustrated comprises a bolt 1 of the usual cylindrical shape provided with a standard screw thread 2. The screw thread 2 is of uniform cross sectional dimensions throughout the length of the threaded portion of the bolt and is cut upon a uniform diameter with each successive convolution disposed at a uniform axial advance or pitch $p$ with respect to the next convolution. The type of thread which is shown in the drawing and which has been found to be most satisfactory is the standard Acme thread, although any other thread having suitable cross section may be utilized with satisfactory results.

A nut 11, provided with a thread 12 cut in accordance with this invention, is shown mounted on the bolt 1. The cross section of the threads 12 is identical with or complementary to the cross section of the threads 2 on the bolt 1. Further, the threads 12 are disposed at an equal axial advance with respect to one another in such manner that the axial pitch $p$ measured between identical portions of successsive threads is equal to the pitch $p$ of the threads 2 on the bolt 1.

Ordinarily, in threading a nut, the threads 12 are cut with the bottom of the thread lying in a cylindrical surface as represented in Fig. 1 by the straight line 14, but in cutting threads in accordance with this invention the threading operation is performed in such a manner that the bottom of the thread is in the surface generated by the revolution of a curved line 15 about the axis of the nut.

In the preferred form, the threads are cut so that the bottom lies in a surface conforming to a hyperboloid of revolution that may be generated by the revolution of a flat hyperbola about the longitudinal axis of the nut 11. The longitudinal axis of the nut 11, about which the hyperboloid of revolution is generated, may be more specifically defined as the line through the center of the hyperbola perpendicular to the line through the foci of the curve which line is commonly known as the conjugate axis. It will be readily seen, by reference to Fig. 1 of the drawing, that, when threads are cut to conform to a hyperboloid surface, as described, the nut is constricted at a portion which will hereinafter be termed the throat and, in this showing of the invention, the throat 16 is near the centre of the nut 14, and, at this point, the thread of the nut engages the thread of the bolt. The threads spaced from the throat of the nut are cut deeper than the thread at the throat, and the depth of the thread varies with the distance from the throat 16, in accordance with the law defined by the hyperbolic line 15.

As will be observed, each turn of the thread other than the ones in the throat 16 of the hyperboloid will be deeper than the next by a distance represented by the clearance space 17 between the lines 14 and 15. The result of this slight radial displacement of the bottoms of the threads 12 is to provide, under the condition of no load, a small axial clearance space 18 between all of the threads other than those at the throat portion 16. This clearance space 18 also varies with the distance of the thread from the throat portion 16 in accordance with the law represented by the curved line 15, and bears a proportion to the clearance space 17 that depends upon the angle of the faces of the threads 12 to the axis of the nut 11.

It will be readily seen that, by this method, a very accurate distribution of clearance spaces 18 between the threads of the bolt 1 and the threads of the nut 11 may be provided by regulating the depth of the threads in accordance with a predetermined law. Further, it may be seen that the variation of the depth of the threads is of sufficient amount to be in keeping with the ordinary limits of precision in the thread-cutting art.

The position of the throat portion or point of initial contact 16 of the threads 2 and 12 may be so selected along the length of the nut that, when a predetermined load is applied to the bolt and nut in the direction indicated by the arrows 19 in Fig. 1, the bolt will be elastically stretched, and the nut elastically compressed by an amount that will take up the clearances 18 and thereby cause all turns of the threads 12 on the nut to engage the threads 2 on the bolt.

As the load is applied, contact between the threads will be caused to extend progressively in each direction from the point of initial contact 16 to the ends of the nut. The axial position of the point of initial contact may be determined as a function of the elastic properties of the bolt 1 and the nut 11 which will depend on the material and dimensions.

It may thus be seen that, for a predetermined load upon a bolt-and-nut structure of given cross-sectional area and elastic characteristics, a curve 15 for developing a surface upon which the thread is to be cut may be so selected that the load transmitted from the bolt to the nut will be uniformly distributed along the threads in contact.

In Figs. 2 and 3, one method of generating a thread upon a surface having the shape of a hyperboloid of revolution is shown. The nut blank 11 may be set up to rotate about its axis 20 and a thread-cutting tool (not shown) may be caused to traverse the inner surface of the nut along a line 21 that extends at an angle to the axis 20 and in a plane parallel thereto.

The threads 12 may also be cut by guiding a cutting tool 25 by means of a suitable templet 26 having a contour identical with the contour of the line 15, as shown diagrammatically in Fig. 4.

It is, therefore, apparent that a nut-and-bolt structure constructed in accordance with the invention will have threads, the clearances between which are such that, when the combination is subjected to a predetermined load, the elastic deformation of the nut-and-bolt structure will take up the clearances, distribute the load and impose equal stresses on the threads in a substantially uniform manner throughout the length of the nut.

While the thread described has been shown as applied to a nut which engages a bolt having a standard thread, it is to be understood that such a thread as disclosed may be cut on a bolt which is intended to engage in a nut provided with a standard thread.

Although I have described and illustrated one embodiment of my invention, it will be obvious to those skilled in the art that various modifications may be made in the relation between the thread clearances and their disposition along the length of the nut and in the method of cutting the threads without departing from the spirit and scope of the invention, as defined in the appended claims.

I claim as my invention:

1. A thread comprising a plurality of turns disposed to conform to a hyperboloid of revolution about the conjugate axis.

2. A screw thread comprising a plurality of turns disposed to conform to a hyperboloid of revolution about the conjugate axis, said turns being uniformly pitched along the axis of the hyperboloid.

3. A screw thread of uniform shape in cross section and having uniform axial advance, said thread being generated upon the surface of a hyperboloid of revolution about the conjugate axis.

4. A nut having an internal thread of uniform pitch disposed to conform to a hyperboloid of revolution about the conjugate axis.

5. A pair of members comprising interfitting male and female threaded parts, the male part having a standard screw thread of uniform pitch and diameter and the female part having a thread of corresponding axial pitch and shape in cross section, said female thread being disposed in the shape of a hyperboloid of revolution about the conjugate axis, the portion of least diameter of which being disposed to accurately engage the threads on the male part.

6. A pair of threaded members comprising a male member having a thread of uniform axial pitch and of uniform diameter, and a cooperating female member having an interfitting complementary thread of axial pitch equal to the pitch of the thread of the male member, the root diameter of the thread of the female member being so varied throughout its length that uniformly increasing longitudinal clearances are provided which compensate for the elastic deformation of the interfitting members when under load and thereby distribute the stresses in the threads in a substantially uniform manner.

7. A pair of members having interfitting threads comprising a bolt provided with a standard thread of uniform pitch and diameter and a cooperating nut having a thread of complementary shape and equal axial pitch, the root diameter of the thread in the nut being so varied throughout the length thereof that uniformly increasing longitudinal clearances are provided on either side of a central portion of the nut to compensate for the elastic deformation of the threaded members under load.

8. A pair of members having interfitting threads comprising a bolt provided with a standard thread of uniform pitch and diameter and a cooperating nut having a thread of complementary shape and equal axial pitch, the root diameter of the thread in the nut being so varied throughout the length thereof that uniformly increasing longitudinal and radial clearances are provided to compensate for the elastic deformation of the threaded members under a predetermined load and thereby prevent the concentration of stress in a portion of the threads.

9. A pair of members having interfitting threads comprising a bolt provided with a thread of uniform pitch and diameter and of non-rectangular cross section and a cooperating nut having a thread of complementary shape and equal axial pitch, the root diameter of the thread in the nut being so varied throughout that uniformly increasing longitudinal clearances are provided between the threads to compensate for the elastic deformation of the threaded members under load.

10. A pair of members having interfitting threads comprising a bolt provided with a thread of uniform pitch and diameter with non-parallel sides, a nut disposed in threaded engagement with the bolt, said nut being provided with internal threads of complementary shape and having the same uniform pitch as the threads on the bolt, the roots of the threads in the nut lying on a surface of predetermined curvature to provide longitudinal clearances between the threads of the bolt and nut of increasing width from the center of the nut in each direction, thereby to effect an equal distribution of stresses over all the threads when the members are subjected to a predetermined load.

In testimony whereof, I have hereunto subscribed my name this 13th day of January, 1928.

GEORGE M. EATON.